United States Patent Office

3,487,093
Patented Dec. 30, 1969

3,487,093
FLUORINATED OLEFINS
Richard F. Merritt, Huntsville, Ala., assignor to Rohm and Haas Company, Philadelphia, Pa., a corporation of Delaware
No Drawing. Filed Apr. 12, 1967, Ser. No. 630,190
Int. Cl. C07c *169/58, 23/34;* A01n *9/30*
U.S. Cl. 260—397.2   7 Claims

ABSTRACT OF THE DISCLOSURE

Controlled addition of elemental fluorine to complex organic olefins may be accomplished by the use of inert diluents and low temperatures. Addition of the fluorine is made to the carbon-carbon double bond. Fluorinated steroids produced by this method have use as pharmaceuticals, agricultural chemicals and inhibitors in chemical processes.

---

This invention deals with specific fluorinated olefins as new compositions of matter, and a method for their preparation. More particularly, it is concerned with the direct preparation of bicyclic fluoride and vicinal difluorides.

The direct fluorination of perhalo-olefins has previously been known (cf. W. T. Miller, J. Am. Chem. Soc., 86, 51 (1964); vinyl acetate [Yakubovich, U.S.S.R. Pat. No. 162,825, CA 62, 451 g.]; and diethyl fumarate [Yakubovich, U.S.S.R. Pat. No. 165,162, CA 62, 9018 g.]. Also, cf. crotonic acid, hexadecene, oleic acid; [Bockemüller, Ann. 506, 20 (1933).

As far as is known, the direct addition of elemental fluorine to a steroidal double bond, to simple unsubstituted olefins, has not previously been disclosed. The present invention accomplishes such additions by a one-step method of direct low-temperature fluorination. The vicinal difluorides which are produced are predominantly of the cis-configuration. To demonstrate the practicality of the invention difluorides of the following olefins have been prepared: stilbene, 1,1-diphenyl-ethylene, acenapthylene, indene, phenanthrene, cholesteryl chloride, cholesteryl acetate, acrylyl chloride, $\Delta^4$ cholestene-3-one, cyclohexane, styrene, and bicyclo (2.2.1) heptene.

EXAMPLE 1

General method

The general procedure of the present invention preferably consists in diluting the olefin as much as ten-fold with $CCl_3F$, and forming a slurry by adding an equal weight of finely-ground Molecular Sieve (No. 4A). This mixture is vigorously stirred, then cooled to about —78°, and thoroughly degassed. Fluorine is slowly metered into the reactor above the stirred solution in such a manner as to keep the pressure of fluorine below 50 mm. The exact stoichiometric amount of fluorine is controllable by varying the volume of pressure of the reservoir bulb. The uptake of fluorine usually will be complete to within the vapor pressure of Freon 11 at —78° (~3 mm.).

EXAMPLE 2

Preparation of 1,2-difluoro, 2-methylindane 2-methylindane (2.60, 20 mmoles) was fluorinated at —78° in the manner described in Example 1 with 20 mmoles of fluorine. The uptake of fluorine was smooth and complete within two hours. The fluorine partial pressure never exceeded 50 mm. at any time. The solvent was distilled away leaving a colorless oil which rapidly darkened upon exposure to air. Rapid elution on anhydrous silica gel produced 0.94 g. of trans-1,2-difluoro, 2-methylindane. Continued elution with 5:1 pentane:methylene chloride afforded 0.51 g. of cis-1,2-difluoro, 2-methylindane. Both isomers decomposed when vacuum distilled. The complete spectral properties are in accordance with the assignment of structure.

*Analysis.*—Calcd. for $C_{10}H_{10}F_2$: C, 71.41; H, 5.99. Found: trans—C, 71.33; H, 6.20; cis—C, 70.81; H, 6.36.

EXAMPLE 3

Preparation of 1,2-difluoroindane

Indene (5.1 g., 44 mmoles) was fluorinated at —78° with 45 mmoles of fluorine within one hour. The partial pressure of fluorine in the reactor was maintained below 50 mm. Removal of solvent produced the adduct as a colorless oil which was immediately chromatographed on silica gel. The trans difluoride (2.0 g., 32% yield) was eluted with a 1:1 pentane-methylene-chloride mixture. No evidence of the cis isomer was indicated by fluorine NMR of the crude product before chromatography. Spontaneous decomposition of a purified sample was noted after standing for 10 days at 25°. Spectral analysis are consistent with the assigned structure.

*Analysis.*—Calcd. for $C_9H_8F_2$: C, 70.12; H, 5.23. Found: C, 69.74; H, 4.98.

EXAMPLE 4

Preparation of fluorinated $\Delta^4$-cholesten-3-one $\Delta^4$-cholesten-3-one (5.0 g., 13 mmoles) was slurried in 20 ml. $CCl_3F$ along with 2.0 g. of Molecular Sieve (No. 4A). The slurry was cooled to —78°, degassed, and treated with 13 mmoles of fluorine. The partial pressure of fluorine was maintained below 50 mm. The crude product was chromatographed on silica gel with methylene chloride followed by recrystallization from methanol to produce a colorless solid M.P. 178–188°. The proton and fluorine NMR. along with the infrared spectra are in accord with the structure as 4a, 5a-difluorocholestan-3-one.

*Analysis.*—Calcd. for $C_{27}H_{44}F_2O$: F, 8.99. Found: F, 9.40.

EXAMPLE 5

Preparation of fluorinated norbornene

Norbornene (4.2 g., 44 mmoles) was fluorinated at —78° with 44 mmoles of elemental fluorine as a 10% solution in $CCl_3F$. Sodium fluoride (2.0 g.) was present to act as a scavenger for any HF produced. Removal of the solvent and sodium fluoride left 2.9 g. (59% yield) of 7-fluoro norbornene, m. 62° dec. The solid was found to rapidly decompose, with evolution of HF, if it were not stored in solution at —78°.

The compound was purified by vapor phase chromatography on a 20% Kel-F 20 Chromosorb P column at 61°. An approximately equimolar mixture of the syn-anti isomers gave a colorless solid m. 68° dec. Thermal instability precluded direct elemental analysis but the molecular weight by the mass spectral gaseous effusion method was 111.3 (theor. $C_7H_9F$=112).

EXAMPLE 6

Use of novel compounds in agricultural and sanitary applications

Employing the standard Peet-Grady test, representative compounds of this invention give evidence of good knockdown and kills of the common housefly, *Musca domestica*. Evaluation of representative compounds of this invention, such as those prepared in Examples 1–5 above, is made by the Slide-Germination Method described in Phytopathology 33, 627–632 (1943). Such evaluations demonstrate convincingly that the novel compounds possess considerable fungicidal activity against several species of fungi.

I claim:
1. 4a, 5a-difluorocholestan-3-one.
2. 1,2-difluoro, 2-methylindane.
3. 1,2-difluoroindane.
4. 7-fluoro-norbornene ($C_7H_9F$).
5. A method for the direct fluorination of steroidal olefins to cis-vicinal difluorides which consists in diluting the substrate with an inert solvent to form a slurry and slowly metering fluorine into the slurry at low temperatures.
6. The method of claim 5 in which the temperature of the reaction is approximately −78° C.
7. The method of claim 5 in which the pressure of the fluorine is maintained at about 50 mm. during the metering of the gas into the stirred slurry.

References Cited

Merritt et al.: "Journal of the American Chemical Soc.," April 1966, pages 1822–1823 relied on.

ELBERT L. ROBERTS, Primary Examiner

U.S. Cl. X.R.

260—648, 650